United States Patent [19]
Skaar et al.

[11] Patent Number: 5,401,520
[45] Date of Patent: Mar. 28, 1995

[54] APPARATUS AND METHOD FOR DEFROSTING FROZEN PROTEINACEOUS FOOD BLOCKS

[75] Inventors: Gary R. Skaar, Marshall; Jay I. Gust, Poynette; Larry C. Gundlach, Madison; Dave F. O'Brien, Madison; Kurt F. Fischer, Madison, all of Wis.

[73] Assignee: Oscar Mayer Foods Corporation, Madison, Wis.

[21] Appl. No.: 219,068

[22] Filed: Mar. 29, 1994

[51] Int. Cl.6 ............................................. A23L 1/00
[52] U.S. Cl. .................................. 426/524; 99/474; 99/483; 426/393
[58] Field of Search .................. 426/524, 393; 99/474, 99/483, 516; 62/407

[56] References Cited

U.S. PATENT DOCUMENTS

| | | | |
|---|---|---|---|
| 2,079,304 | 5/1937 | Polderman | 426/419 |
| 2,906,620 | 9/1959 | Jung | 426/524 |
| 3,604,334 | 9/1971 | Ballentine | 99/483 |
| 4,066,011 | 1/1978 | Ballentine | 99/483 |
| 4,204,006 | 5/1980 | Emgard et al. | 426/524 |
| 4,385,075 | 5/1983 | Brooks | 426/524 |
| 4,727,801 | 3/1988 | Yokoi et al. | 99/476 |
| 4,824,685 | 4/1989 | Bianco | 426/418 |
| 5,041,298 | 8/1991 | Wallace et al. | 426/418 |
| 5,285,719 | 2/1994 | McFadden et al. | 99/483 |

Primary Examiner—George Yeung
Attorney, Agent, or Firm—Lockwood, Alex, Fitzgibbon & Cummings

[57] ABSTRACT

A forced air defrost tunnel apparatus and method are provided for accomplishing carefully controlled defrosting of large quantities of bulk frozen food, such as pork, beef, lamb, chicken and turkey in whole muscle form, as well as bacon bellies and fish. The principle support for and shape of the defrost tunnel is provided by a stack or train of stacks of frozen proteinaceous food boxes or bundles that alternate with support spacer racks. An air containment device, preferably consisting primarily of a tarp, is closely secured over the stack or train of stacks. A supply of high pressure air at a temperature greater than that of the frozen food is forced through the defrost tunnel and flows through passageways within the support spacer racks.

20 Claims, 2 Drawing Sheets

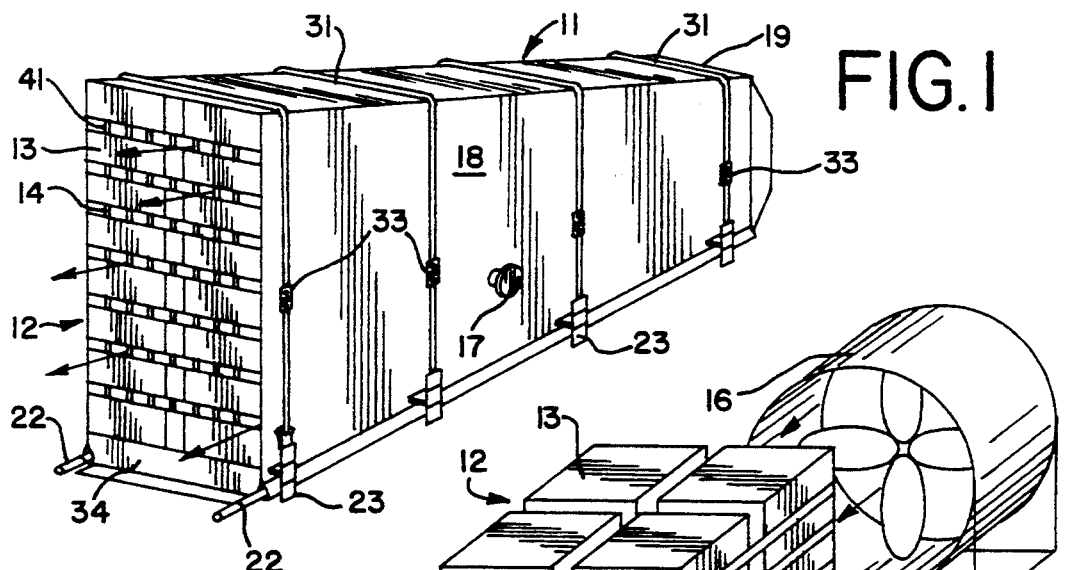
FIG. 1
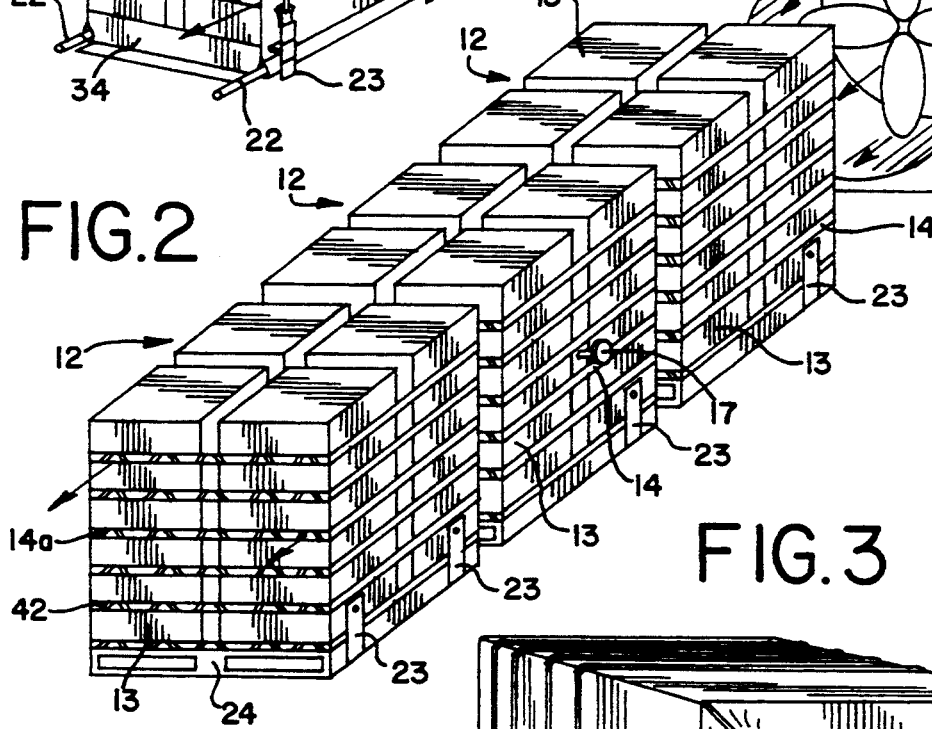
FIG. 2
FIG. 3
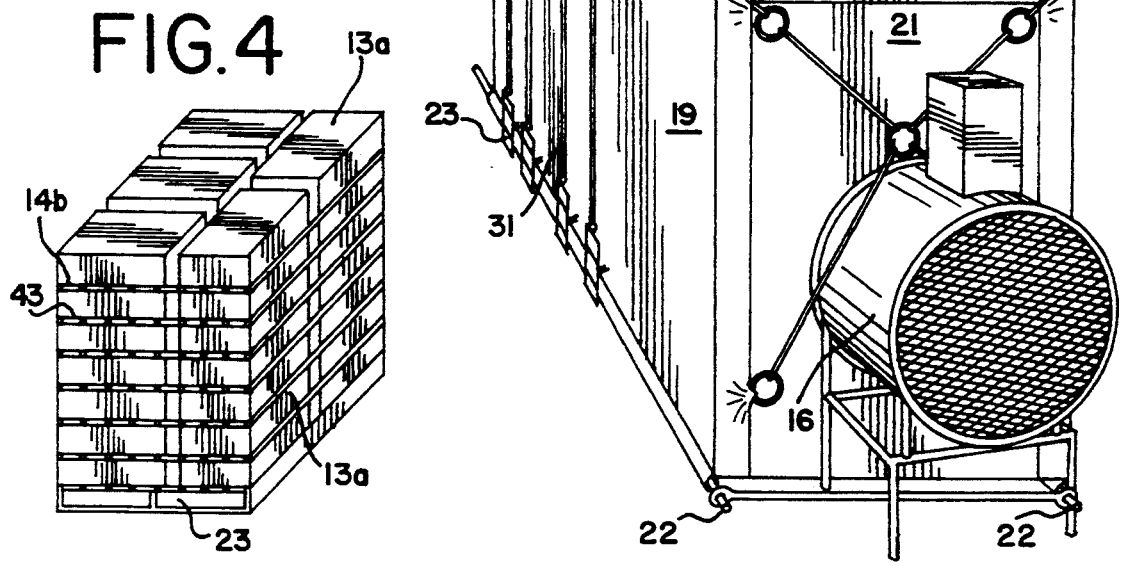
FIG. 4

APPARATUS AND METHOD FOR DEFROSTING FROZEN PROTEINACEOUS FOOD BLOCKS

BACKGROUND AND DESCRIPTION OF THE INVENTION

The present invention generally relates to the defrosting of food in bulk, more particularly to equipment and procedures for defrosting boxes or bundles of protein food supplies by subjecting bulk protein food supplies to controlled forced air. The boxes or bundles are formed into stacks having separators to space the boxes or bundles from one another while permitting air flow therebetween. A source of forced air directs defrosting air onto one face of this stack, and a readily collapsible covering supported by the stack defines a defrost tunnel for containing the forced air flow such that same flows between generally horizontal and generally vertical faces of the boxes or bundles of the stack. A plurality of stacks can be included in order to form a train of stacks that defines the tunnel.

In the general context of food processing, it is typically desirable to use fresh protein sources such as meats, poultry and fish. Experience has shown that the quality of protein food supplies is often lessened when the protein food supply is frozen and then must be defrosted prior to processing into a final food product. Nevertheless, it is often advantageous to subject such proteinaceous food products to cryogenic conditions so as to extend the life of the proteinaceous food source in order to preserve valuable food and/or to increase the overall market value of the proteinaceous food supplies by having the ability to hold same in a frozen state until market conditions develop that are more favorable to the meat, poultry or fish processor.

Incorporating a cryogenic holding step in the proteinaceous food product processing procedure adds cost to the procedure due in large measure to needed packaging to reduce the chance of damage during freezing, as well as the energy costs in effecting the freezing and maintaining the frozen products. Additional costs can be encountered in operations that are in the nature of defrosting. In a typical operation, defrosting cannot simply be allowed to occur by unattended standing at a temperature greater than the frozen food. With proteinaceous food supplies, it is important and typically required to closely account for the total length of time that a supply is unfrozen before it enters into the food processing chain. There is thus an important objective to somewhat carefully control the defrosting procedure so that the time of defrost completion can be accurately gauged. Defrosting approaches have been accomplished or proposed which can require specialized and/or expensive equipment and substantial energy consumption. Because of particularly close margins in the proteinaceous food industry, it is important to both minimize equipment and energy costs while at the same time providing a defrosting approach that is nevertheless safe and closely controlled.

Additionally, it is important that any freezing and defrosting approach minimize possible detrimental effects on the quality of the proteinaceous food supply. Many defrosting procedures used heretofore provide protein food supplies that are not of the same quality as fresh protein food sources. These types of protein food sources do not process as satisfactorily as fresh proteinaceous food sources. Often products, for example hams, processed from frozen sources are of reduced quality when compared with those produced from fresh meat. For example, defrosting procedures can retain ice crystals or can defrost in a manner that reduces the quality of the meat such as by increasing purge or by degrading the protein. Improperly defrosted meats can increase the risk of spoilage. In the past, it has been much more acceptable to use frozen protein sources in preparing products that are ground and/or reformed, as opposed to products that are more traditionally of a whole muscle character. For example, heretofore the processing of hams having excellent eating and appearance characteristics has not been consistently achieved when the hog ham portions have been frozen between stun and processing into whole muscle ham products.

In summary, the present invention provides closely controlled defrosting of cryogenically preserved proteinaceous food supplies such as pork, beef, chicken, turkey, lamb and fish. The cryogenically preserved supplies themselves provide a structural component of the defrosting tunnel in accordance with the present invention. Boxes or bundles of frozen proteinaceous food supplies are formed into stacks having spacer racks positioned therebetween in alternating fashion. These stacks, which may be organized into a train of stacks, provide the principal support, structure and shape for the defrosting tunnel in accordance with the present invention. A source of high velocity flow of air at a temperature above that of the proteinaceous food supply directs the air to one face of the stack or train. A readily collapsible air containment device closely surrounds at least the top surface and the right and left vertical faces of the stack or train in order to form a tunnel into which the high velocity air flow is directed. This high velocity air flow proceeds between the boxes or bundles, including passage through the spacer racks therebetween until the air flow exits the tunnel from an open or exit face.

It is accordingly a general object of the present invention to provide an improved forced air defrost tunnel and defrosting process.

Another object of the present invention is to provide an improved forced air defrost tunnel which carries out controlled defrosting.

Another object of this invention is to provide an improved forced air defrost tunnel and process which allows for the use of whole muscle meat that had been frozen prior to completion of processing of same into whole muscle products such as hams.

Another object of the present invention is to provide an improved defrost tunnel and process which is inexpensive and readily broken down for easy storage when not in use.

Another object of the present invention is to provide an improved forced air defrost tunnel for rapidly and uniformly defrosting food processing raw materials without substantial capital costs.

Another object of this invention is to provide an improved forced air defrosting apparatus and method for defrosting ham raw material so as to make smoked cooked hams with quality characteristics equal to hams made from fresh raw materials.

These and other objects, features and advantages of the present invention will be clearly understood through a consideration of the following detailed description.

BRIEF DESCRIPTION OF THE DRAWINGS

In the course of this description, reference will be made to the attached drawings, wherein:

FIG. 1 is a perspective view generally from the discharge end of an apparatus in accordance with the present invention;

FIG. 2 is a perspective view of an apparatus generally shown in FIG. 1 but with certain components omitted;

FIG. 3 is a perspective view generally from the upstream end of the apparatus that is generally illustrated in FIG. 1;

FIG. 4 is a perspective view of an alternate stack component within the scope of the present invention;

DESCRIPTION OF THE PARTICULAR EMBODIMENTS

A forced air defrost tunnel, generally designated as 11 in FIG. 1 and FIG. 3, includes a plurality of stacks, generally designated as 12, which include frozen proteinaceous food blocks 13. Positioned between each food block 13 is a support spacer 14. Frozen proteinaceous food blocks 13 and support spacers 14 alternate such that each frozen proteinaceous food block 13 is supported by a support spacer 14.

Figure 6:
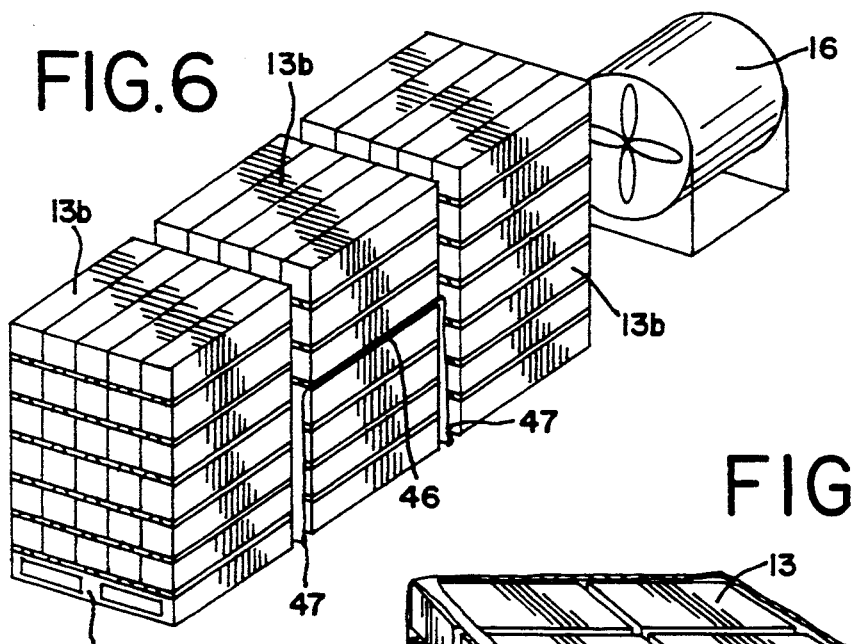
FIG. 6 is a perspective view of another embodiment of the present invention in which certain components are omitted for illustrative purposes.

When desired, a plurality of stacks 12 may be arranged in end-to-end relationship to each other in order to form a train as illustrated in FIGS. 1, 2, 3 and 6. The train of FIGS. 1, 2 and 3 includes three stacks 12. Preferably, the stacks are spaced from each other, which has been found to facilitate air flow through the stacks and into contact with each frozen proteinaceous food block 13. With more particular reference to the stacks illustrated in FIG. 2, each layer of blocks is oriented in a two-by-two arrangement, with spacing being provided between opposing vertical faces of the blocks 13 in order to facilitate movement of forced air along these vertical faces. In the stack embodiment illustrated in FIG. 4, the frozen proteinaceous food blocks 13A are oriented in a three-by-two arrangement. In FIG. 6, the stacks include frozen proteinaceous food blocks in a five-by-one arrangement.

A source of high velocity air flow is positioned at one end, near the upstream face, of the stack 12 or of the upstreammost stack of a train when a train of stacks is used. The illustrated air flow source 16 forces a flow of air into and through the stack or train of stacks as more fully described herein. The temperature of this air typically will be controlled by monitoring and controlling the temperature of the air within the room or enclosed area within which the apparatus is located. This can be accomplished by providing a defrost room having a controlled temperature. Alternatively, air into the air flow source can be temperature controlled. In a typical arrangement, the air flowing through the defrost tunnel will be at a temperature of between about 40° and about 50° F., preferably between about 41° and about 47° F., most preferably between about 43° and about 45° F. When room air is the source of the supply of controlled forced air, the controlled air temperature should be modified to take into account temperature rises which occur as the proteinaceous food blocks defrost, particularly when the temperature thereof rises before and after passage through the latent heat stage. At least one temperature monitor 17 is preferably included within a substantially central location of the stack or train of stacks.

Figure 7:
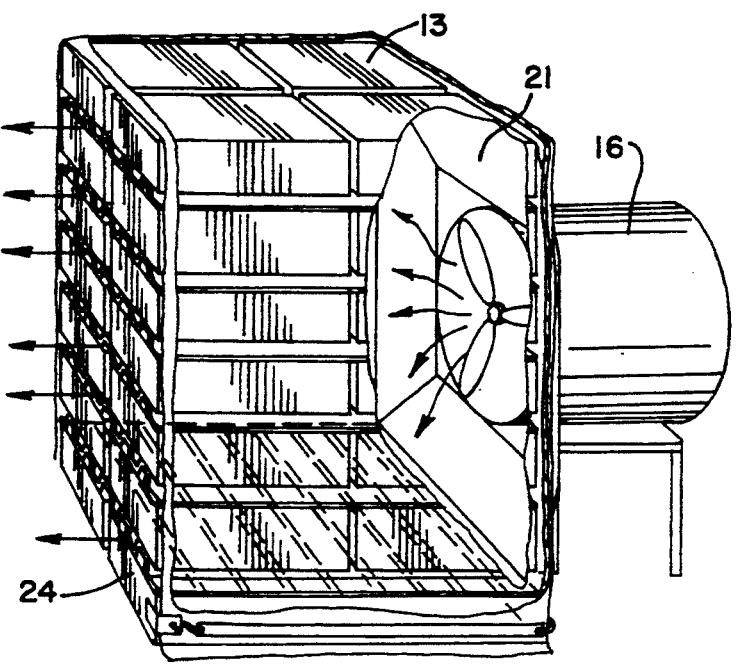
FIG. 7 is a perspective view, partially broken away, of an alternate embodiment from which the air containment arrangement has been omitted.

An air containment component 18 (shown in FIGS. 1, 3 and 5 and omitted from FIGS. 2, 4, 6 and 7) closely surrounds and engages at least the top surface, the right generally vertical surface and the left generally vertical surface of the stack or train of stacks in a manner so as to provide a continuous, closed tunnel from the air flow source 16 to the exit end face or downstreammost face of the stack or train of stacks. A plenum component 19 forms a part of this continuous tunnel. In the preferred embodiment, the air containment component is in the form of a tarp made of any suitable substantial air impervious material. Polymeric tarps have been found to be especially suitable in this regard. The plenum component 19 can be or include a portion of this air containment component 18, as generally shown in FIGS. 1 and 3. The plenum component can include a more rigid structure such as the sheet metal duct 21 illustrated in FIG. 7. This plenum arrangement can include a combination of the tarp and the duct as generally shown in FIG. 3.

Figure 5:
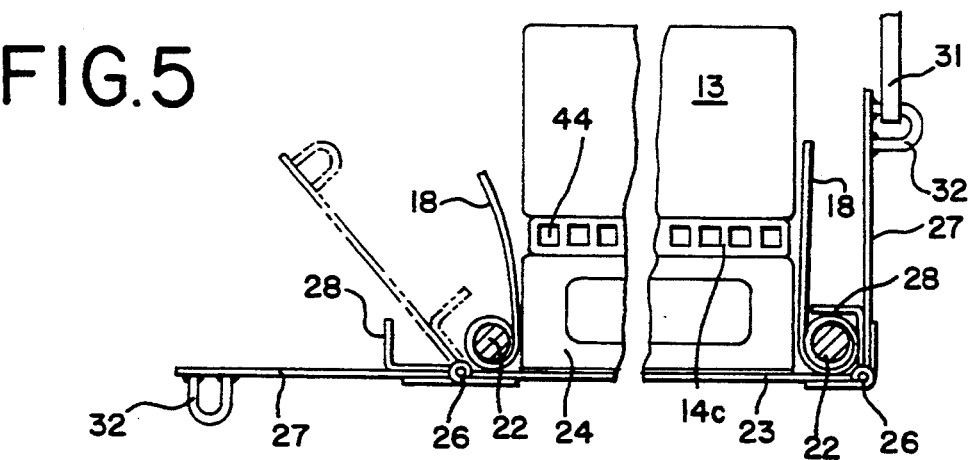
FIG. 5 is a detailed end view, partially broken away, of an apparatus as generally shown in FIG. 1 during a stage of the assembly thereof.

It is important that the air containment component 18 tightly enclose the stack or train of stacks so that the forced air flows between the box or bundle blocks while avoiding short-circuiting around the outwardly facing surfaces of the stack or train of stacks. A tarp securement assembly., most fully illustrated in FIGS. 1, 3 and 5, is preferably provided. The illustrated assembly includes two longitudinal rods 22. Opposite longitudinal end portions of the tarp 18 are rolled onto respective rods 22. At the beginning of a defrost cycle, one or both of the rods are rotated until the tarp is taut over at least the top, right and left surfaces of the stack or train. While the proteinaceous food supplies of the blocks are defrosting, they begin to soften and have a tendency to sag. As a result, the total height of each stack 12 is reduced over the defrosting cycle. When the height thus decreases, it is has been found to be advantageous to periodically correspondingly reduce the height of the tunnel.

The illustrated arrangement for effecting this adjustment while maintaining the secure fit of the tarp over the stack or train of stacks includes a plurality of brackets 23. Illustrated bracket 23 is sized and structured to be positioned along the bottom surface of a pallet 24 which is used for conveniently supporting and transporting each stack. With particular reference to FIG. 5, each bracket 23 includes at least one hinge 26 for rotatably receiving a bracket extension 27. Extension 27 includes a generally transverse finger 28. When the bracket extension 27 is generally closed as illustrated on the right side of FIG. 5, the rod 22 and (when present) rolled tarp are tightly held in rotation-preventing fashion. This holding is effected in the illustrated embodiment by forming an enclosure between the finger 28 and a portion of each of the pallet 24 and of the bracket body and extension 27. When the hinged portion of the bracket is open, for example as generally shown in phantom on the left side of FIG. 5, the rod 22 is free to rotate, for example, in order to tighten the tarp 18 over the stack or train of stacks during the defrosting cycle.

After such an adjustment is made, the hinged portion is returned to its engaging position as shown on the right side of FIG. 5.

It is also preferred to include one or more adjustable straps 31 which can be secured to opposing ends of each bracket 23. An eyelet 32 is provided to facilitate attachment of the adjustable strap to the bracket. Each adjustable strap 31 preferably includes a ratcheting mechanism 33 of a generally known type by which the length of the strap can be adjusted. In a typical operation, this length is decreased after the tarp height is adjusted so that the tarp remains in close engagement with the top, right and left faces of the stack or train of stacks even when subjected to a high speed air flow generated by the high velocity air flow source 16. A foot plate 34 is preferably provided in order to prevent any substantial air flow through pallet(s) 24.

With more particular reference to the support spacers, they are designed to allow air flow therethrough in the longitudinal direction. In this instance, the longitudinal direction is defined as being substantially parallel to the flow of forced air into and through the stack or train of stacks, as generally illustrated by the flow arrowheads depicted in the various drawings hereof. Illustrated support spacers include spacers 14 having a plurality of vertical ribs 41 extending generally longitudinally. Support spacers 14A include a plurality of angled wedges 42. Support spacers 14B include a plurality of arches 43 which are opened in the longitudinal direction. Support spacers 14C include a plurality of longitudinal passageways 44 therethrough. In the preferred support spacers, gaps are provided on the surface thereof that contacts at least the bottom of the food blocks. By this arrangement, the air flow is permitted to directly contact a greater surface area of the box or bundle block than when no such gaps are provided. This is most typically accomplished by having block-engaging surfaces of each spacer take the form of spaced-apart horizontal pedestals. While the pedestals provide support for the blocks which they engage, the free space or gaps between the pedestals permits direct contact between the forced air flow and portions of the bottom surfaces and/or the top surfaces of the blocks.

In some instances, it may be desirable to include a supplementary support such as a platform 46 illustrated in FIG. 6. Platform 46 includes legs 47 for engaging the floor or ground. Such a platform is useful to reduce the chance that the stack may topple or be seriously deformed as the mass of upper blocks 13b weighs on the lower blocks, particularly after defrosting has proceeded to a substantial extent.

With more particular reference to the frozen proteinaceous food blocks, they can be boxed or unboxed. In a typical box arrangement, frozen pork, beef, lamb, turkey, chicken or fish whole portions are sealed within a polymer bag. The polymer bag has been found to be particularly useful in collecting liquid purge from the proteinaceous material as it defrosts, thereby avoiding loss of moisture and nutrients. It is often desirable to encase the thus packaged frozen proteinaceous material within a hexahedron box constructed, for example, of waxed paperboard. In other instances, the box can be omitted. For example, bacon bellies can be packaged as a bundle of bellies within a polymeric bag suitable for freezing and handling. Each frozen proteinaceous food block will typically have a weight between about 40 pounds and about 60 pounds.

Desirable forced air flow rates can vary somewhat depending upon the proteinaceous material being defrosted. Generally speaking, when the block includes a box, or when the proteinaceous material has a relatively high water content, higher flow rates will be needed. It will be appreciated that boxes offer some insulation and the latent heat of melting for ice crystals consumes a large quantity of heat. For example, bacon bellies have a lower moisture content than hams and, in the case of unboxed bundles of bacon bellies, the flow rate of forced air can be as low as 100 feet per minute. Generally speaking, higher flow rates are desired. In the case of boxed proteinaceous food blocks, the minimum flow rate is approximately 700 feet per minute. The general range of flow rates is between about 100 and about 3000 feet per minute. A typical range for boxed blocks is between about 700 and about 1500 feet per minute. Usually, a flow rate of between about 700 and about 1000 feet per minute achieves suitable defrosting during acceptable defrost time periods.

Spacing between the blocks should be on the order of one inch to three inches between adjacent longitudinally oriented sides or faces of the blocks. Spacing between the transverse ends or faces of the blocks can be somewhat less and still provide adequate air flow around the blocks and allow for proper defrost time and temperatures. It has been found that, if no such spacing is provided, defrosting time is noticeably increased. Spacing between the outlet of the air flow source 16 and the downstream face of the stack or train of stacks must be great enough to avoid excessive tunnelling through only a portion of the stack or train while providing adequate air flow through the remainder of the stack or train. This spacing generally equates to the length of the plenum. When the outlet surface of the air flow source is generally the same as the upstream surface of the initial stack, the plenum length can be shorter than in those instances where the air flow source exit surface is significantly less than the upstream face of the initial stack. In a typical situation, the plenum spacing can be between about 20 inches and about 60 inches.

It will thus be seen that the present invention provides a new, useful and unique forced air defrost tunnel and procedure which have a number of advantages and characteristics including those pointed out herein and others which will be apparent. Preferred embodiments of the invention have been described by way of example, and it is anticipated that modifications may be made without departing from the spirit of the invention or the scope of the appended claims.

We claim:

1. An apparatus for defrosting frozen proteinaceous food blocks, comprising:
   a plurality of frozen proteinaceous food blocks capable of being oriented into a stack containing a plurality of said blocks;
   a plurality of support spacer racks, each of said frozen proteinaceous food blocks being supported by at least one of said support spacer racks, each said rack having passageways therethrough for allowing movement of air among the frozen proteinaceous food blocks;
   said plurality of support spacer racks and plurality of frozen proteinaceous food blocks being arranged in at least one stack, each said stack having a plurality of said racks and a plurality of said blocks in vertically alternating relationship of rack to block, said stack having a top, a bottom, a generally vertical left face, a generally vertical right face, an upstream face and a downstream face;

a source of high velocity air flow which directs air at a high velocity toward said upstream face of the stack and through said plurality of support spacer racks of said stack;

an air containment device substantially closely surrounding at least said top, said left face and said right face of said stack to thereby define a defrost tunnel; and a plenum joining said source of high velocity air flow with said stack such that high velocity air flow therefrom is directed to said upstream face of the stack, longitudinally through said plurality of racks, and out of said defrost tunnel at said downstream face of the stack.

2. The apparatus in accordance with claim 1, wherein a plurality of said stacks are provided to form a train of stacks including an upstream stack and at least one downstream stack, with the downstream face of the upstream stack being directly opposite of and generally closely spaced from the upstream face of said downstream stack, whereby high velocity air flow from the upstream stack is transferred to and through said downstream stack.

3. The apparatus in accordance with claim 1, wherein said air containment device engages said top, left face and right face of said stack whereby air flow between said air containment device and said top, said left face and said right face is substantially prevented.

4. The apparatus in accordance with claim 1, wherein said passageways of the support spacer racks are generally longitudinal as defined by the flow of high velocity air from the air flow source.

5. The apparatus in accordance with claim 1, wherein said air containment device is supported substantially exclusively by the stack.

6. The apparatus in accordance with claim 1, wherein said air containment device is a tarp.

7. The apparatus in accordance with claim 6, wherein said tarp is adjustably secured over said stack, whereby the height of the defrost tunnel is decreased when the stack decreases in height as defrosting proceeds.

8. The apparatus in accordance with claim 7, wherein the tarp adjustment assembly includes a rod onto which the tarp is rolled and an assembly for selectively grasping and releasing same.

9. The apparatus in accordance with claim 8, further including strapping secured to the assembly for selectively grasping and releasing, said strapping having means for adjusting its length.

10. The apparatus in accordance with claim 8, wherein said tarp adjustment assembly includes a bracket having a hinged extension which, when rotated, secures the rod and tarp in position against undesired rotation.

11. The apparatus in accordance with claim 1, wherein said defrost tunnel is substantially entirely open at its downstream end.

12. The apparatus in accordance with claim 1, further including a platform having ground-engaging legs, said platform being positioned within said stack.

13. A method for defrosting frozen proteinaceous food blocks, comprising the steps of:

assembling a stack of frozen proteinaceous food blocks by positioning a plurality of frozen proteinaceous food blocks onto a support spacer rack, positioning another support spacer rack over the plurality of frozen proteinaceous food blocks and adding another plurality of frozen proteinaceous food blocks onto the latter support spacer rack, and continuing said assembling step until a stack having a desired number of frozen proteinaceous food blocks is formed;

positioning an air containment device over the stack, said air containment device substantially closely surrounds said stack in order to define a defrost tunnel having an upstream opening and a downstream opening;

directly a high velocity air flow to the upstream opening of the defrost tunnel, through at least the support spacer racks of the stack, and out of the downstream opening of the defrost tunnel; and proceeding with said high velocity air flow step until the proteinaceous food of the blocks has been defrosted.

14. The method in accordance with claim 13, further including an additional assembly step to form a second stack, which procedure includes positioning the second stack closely spaced upstream of opposing stack and within the defrost tunnel, and said high velocity air flow includes passing the high velocity air from one stack to another stack within the defrost tunnel.

15. The method in accordance with claim 13, wherein said high velocity air flow directing step includes passing the high velocity air flow through longitudinal passageways within the support spacer racks and flowing the air therethrough in a direction that is longitudinal with respect to the defrost tunnel.

16. The method in accordance with claim 13, further including adjusting the height of the air containment device after the food product defrosting has proceeded in order to thereby establish close contact between the air containment device and the top, the left face and the right face of the stack.

17. The method in accordance with claim 13, wherein the frozen proteinaceous food blocks include meat, poultry or fish contained with a generally hexahedral box.

18. The method in accordance with claim 13, wherein the frozen proteinaceous food blocks each include a plurality of frozen meat, poultry or fish bulk pieces within a generally flexible polymeric bag.

19. The method in accordance with claim 13, wherein said high velocity air flow is at a flow rate of between about 100 and about 3000 feet per minute.

20. The method in accordance with claim 13, wherein the high velocity air flow is at a temperature of between about 40° and about 50° F.

* * * * *

UNITED STATES PATENT AND TRADEMARK OFFICE
CERTIFICATE OF CORRECTION

PATENT NO. : 5,401,520
DATED : Mar. 28, 1995
INVENTOR(S) : Skaar et al.

It is certified that error appears in the above-indentified patent and that said Letters Patent is hereby corrected as shown below:

On the title page, item [56],
    Under References Cited, after last patent cited, insert:
                    --OTHER PUBLICATIONS
Brochure, "QUICK THAW QTU UNIT SUPER CHILL UNIT", published by Morep Food Process Systems Limited, Wayland, Massachusetts.

Brochure, "PANTHER PLAST FREEZER SPACER", published by Panther Plast, Aktieselskab, November 8, 1993.--

Col. 4, line 34, "assembly.," should read --assembly,--; line 45, delete "is".

Col. 8, line 21, "directly" should read --directing--.

Signed and Sealed this

Twenty-eighth Day of May, 1996

Attest:

BRUCE LEHMAN

Attesting Officer        Commissioner of Patents and Trademarks